United States Patent

Kitazawa

[11] Patent Number: 5,617,241
[45] Date of Patent: Apr. 1, 1997

[54] OPTICAL BEAM SCANNER

[75] Inventor: Hideo Kitazawa, Nagano, Japan

[73] Assignee: Kabushiki Kaisha Sankyo Seiki Seisakusho, Nagano, Japan

[21] Appl. No.: 266,705

[22] Filed: Jun. 28, 1994

[30] Foreign Application Priority Data

Jun. 29, 1993 [JP] Japan .................... 5-04343 U

[51] Int. Cl.$^6$ .................................. G02B 26/08
[52] U.S. Cl. ................ 359/200; 359/198; 359/216; 310/90; 310/177
[58] Field of Search ............. 310/239, 242, 310/38, 40 R, 177, 179, 245, 248–249, 269, 90, 231–236; 359/198–200, 216–219

[56] References Cited

U.S. PATENT DOCUMENTS

| | | | |
|---|---|---|---|
| 4,523,800 | 6/1985 | Yamashita et al. | 359/200 |
| 4,609,251 | 9/1986 | Nakaoka et al. | 359/200 |
| 5,142,176 | 8/1992 | Takahashi | 359/200 |
| 5,371,347 | 12/1994 | Plesko | 359/196 |

FOREIGN PATENT DOCUMENTS

| | | | |
|---|---|---|---|
| 56-55918 | 5/1981 | Japan | 359/200 |
| 58-43421 | 3/1983 | Japan | 359/200 |
| 62-85216 | 4/1987 | Japan | 359/200 |

*Primary Examiner*—James Phan
*Attorney, Agent, or Firm*—Sughrue, Mion, Zinn, Macpeak & Seas

[57] ABSTRACT

A rotating polygon mirror for optical beam scanning. The polygon mirror is fixed to a rotating shaft and is rotated at a high speed by a drive force of a rotating drive with brushes. Additionally, a magnet is fixed to an inner circumferential surface of a yoke casing that supports the rotating shaft through a bearing, and a rotor core is positioned to confront the magnet fixed to the rotating shaft.

4 Claims, 2 Drawing Sheets

OPTICAL BEAM SCANNER

BACKGROUND OF THE INVENTION

1. Field of the Invention

The invention relates to an optical beam scanner used for a recording apparatus such as a laser beam recording apparatus, in which a rotating polygon mirror is fixed to a rotating shaft that rotates at a high speed.

2. Related Art

As shown in FIG. 4, an example of such a conventional optical beam scanner 1 includes a prismatic rotating polygon mirror 2 with lateral surfaces being formed into mirrors and a brushless motor 4 that rotates a rotating shaft 3, to which the rotating polygon mirror 2 is fixed, at a high speed (see e.g., Japanese Utility Model Examined Publication No. 63-1287).

The brushless motor 4 has: cylindrical casings 5a, 5b (the casing 5b is the bottom), which are put one upon another in two stages; a bearing housing 6 fixed to the upper casing 5a and supporting the rotating shaft 3 through bearings 6a, 6a; a stator 7 fixed to the outer circumference of the bearing housing 6 and having a coil 7a wound around salient poles; a magnet 8a fixed to the inner circumferential surface of a yoke 8 so as to confront the stator 7; a disk 9 attached to the bottom end of the rotating shaft 3; and a rotation detecting sensor 10 confronting the disk 9. When the coil 7a is energized, the magnet 8a rotates integrally with the rotating shaft 3, which in turn rotates the rotating polygon mirror 3 at a high speed to start scanning with an optical beam.

The rotating drive used for an optical beam scanner must satisfy a stringent requirement that the rotating drive not only is free from inconsistent rotation and deviation of rotation but also can rotate at a high speed (4000 rpm or more) with no splash of oil from the bearing section.

However, since the thus constructed optical beam scanner 1 is designed to rotate the yoke 8 integrally with the rotating shaft 3 in order to meet the above requirement, the rotating shaft 3 does not balance well. In addition, a drive circuit (not shown) for controlling conduction to the coil 7a based on the result of the rotation detection from the sensor 10 must be provided, which impairs the performance of the scanner with elevated parts cost and increased current loss within the circuit due to heating of the drive circuit. Moreover, the gap between the yoke 8 and the upper casing 5a encourages noise leakage and makes handling difficult.

SUMMARY OF THE INVENTION

The invention has been made in view of the above circumstances. Accordingly, the object of the invention is to provide an optical beam scanner capable of achieving easy balancing of the rotating shaft and preventing output saturation and noise leakage with reduced parts cost.

According to the present invention, the optical beam scanner, in which a rotating polygon mirror is rotated at a high speed by the drive force of a rotating drive with brushes, includes a rotating shaft to which the rotating polygon mirror for optical beam scanning is fixed, a magnet fixed to the inner circumferential surface of a yoke casing supporting the rotating shaft, and a rotor core fixed to the rotating shaft and confronting the magnet. Thus, the balancing of the rotating shaft is ensured the parts cost is reduced, and performance impairment as well as noise leakage are prevented.

DETAILED DESCRIPTION OF THE PREFERRED EMBODIMENTS

An optical beam scanner of the invention will now be described with reference to the drawings.

Figure 1:
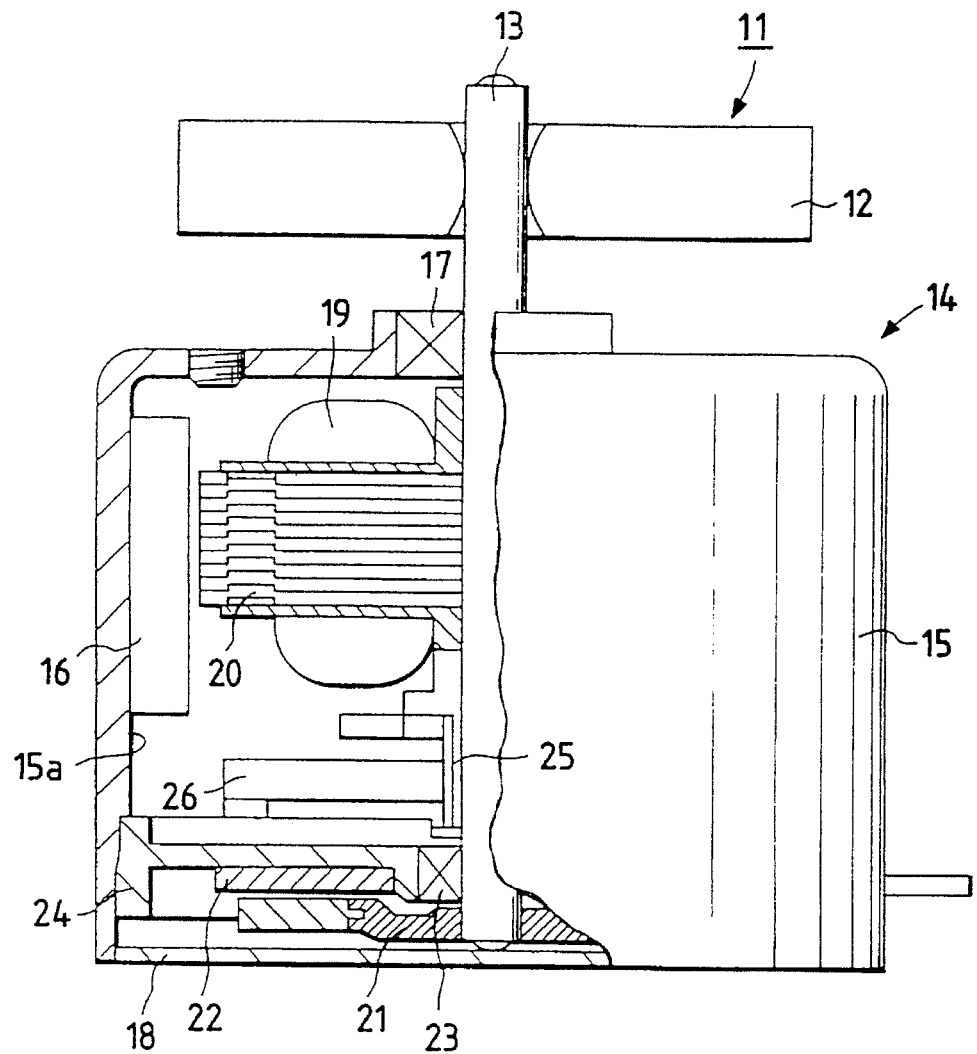
FIG. 1 is a longitudinal sectional view showing the main portion of an optical beam scanner of the invention.

In FIG. 1 an optical beam scanner 11 includes: a prismatic rotating polygon mirror 12 whose lateral surfaces are formed into mirrors; and a dc motor 14 for rotating a rotating shaft 13 to which the rotating polygon mirror 12 is fixed by press fitting. The dc motor 14 serves as a rotating drive with brushes.

The dc motor 14 includes: a yoke casing 15 that fixes a magnet 16 on the inner circumferential surface thereof 15a and supports the upper portion of the rotating shaft 13 through a bearing 17; a thrust bearing plate 18 that fits into the lower portion of the yoke casing 15 so that the bottom end of the rotating shaft 13 is abutted thereagainst; a rotor core 20 being secured to the rotating shaft 13 and having a coil 19 wound around salient poles; an FG magnet 21, secured to the bottom end of the rotating shaft 13 for detecting the rotational position; an FG sensor 22 confronting the FG magnet 21 for detecting the rotation; a brush holder 24 that supports the lower portion of the rotating shaft 13 through a bearing 23; a commutator 25 connected to the coil 19 fixed to the rotating shaft 13; and a brush spring 26 (including a brush) attached to the brush holder 24 so as to be in pressure contact with the commutator 25.

The rotor core 20 is fixed to the rotating shaft 13 with the magnetic center of the magnet 16 shifted (upward in the example shown in FIG.1). By shifting the magnetic center, the rotating shaft 13 is attracted in one direction at all times to improve the support force of the thrust bearing plate.

In the above-mentioned construction, when the rotating shaft 13 is rotated at a high speed by the current flowing through the coil 19 and the magnetic force of the magnet 16 while controlling the rotation of the rotating shaft, the rotating polygon mirror 12 is rotated at a high speed integrally with the rotation of the rotating shaft to thereby start scanning with an optical beam.

At this time, the dc motor 14, which is an inner rotor type motor with brushes, can rotate the rotating shaft 13 with good balance free from inconsistent rotation and eccentric rotation. In addition, no drive circuit is required.

Further, the dc motor can provide torques in the same direction because the commutator and brushes cause the direction of current to switch every predetermined rotation within the coil even if direct current is supplied from an external source. Thus, continuous rotation can be obtained.

Figure 2:
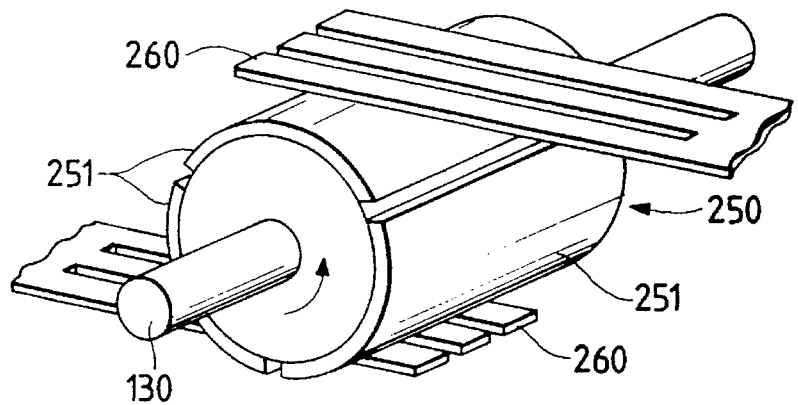
FIG. 2 is an enlarged view showing the main portion of commutator and a pair of brushes.

For example, a mechanism (identified as "commutator 250") in which three (3) cylindrical segments 251 that rotate together with a coil (not shown) are insulated and assembled to a rotating shaft 130 in cylindrical form is arranged as shown in FIG. 2, and direct current is supplied through a pair of fixed platelike brushes 260 that slide with the commutator 250.

However, since noise (spark) is generated when the commutator 250 is switched by the brush 260, the rotational speed of the dc motor becomes inconsistent at this switching timing, which has imposed a problem.

To ensure stable condition from the jitter, the optical beam scanner of the invention sets the rotating polygon mirror 120 scanning timing and the dc motor current direction switching timings as follows.

The number of mirror surfaces of the rotating polygon mirror 120 is made equal to the current direction switching frequency of the dc motor per revolution. In addition, the switching timing of the dc motor is set so as not to be in phase with a mirror surface of the rotating polygon mirror 120.

| Core (slots) | Commutator (segments) | Magnet (poles) | Switching frequency per dc motor rotation |
|---|---|---|---|
| 3 | 3 | 2 (N,S) | 6 |
| 4 | 4 | 2 (N,S) | 8 |

From the above table, the following embodiments can be obtained.

| Core (slots) | Manget (poles) | Number of mirror surfaces |
|---|---|---|
| 3 | 2 | 6 or 8 |
| 4 | 2 | 8 or 2 |

Figure 3:
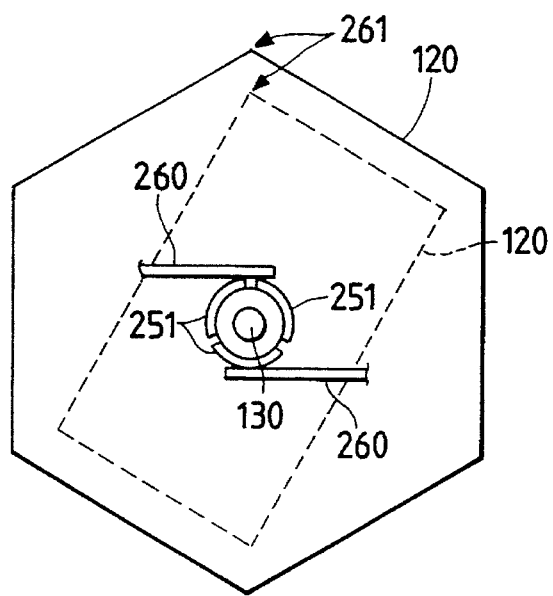
FIG. 3 is a diagram showing an exemplary relationship between the number of mirror surfaces and the dc motor switching timing.
Figure 4:
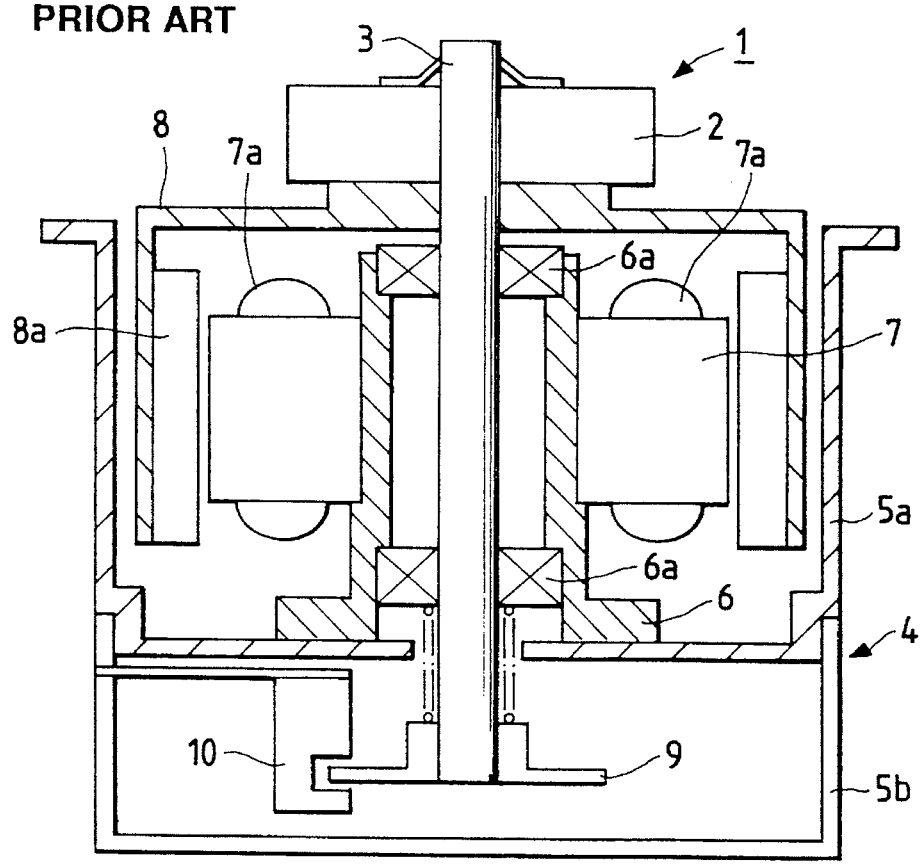
FIG. 4 is a longitudinal sectional view showing the main portion of a conventional optical beam scanner.

The invention is not limited to the embodiments shown in FIG. 2 (an enlarged view showing the main portion of a commutator and a pair of brushes) and FIG. 3 (a diagram showing an exemplary relationship between the number of mirror surfaces and the dc motor switching timing), which are merely examples.

FIG. 3 shows a rotating polygon mirror 120 having six (6) mirror surfaces (indicated by a solid line) and a rotating polygon mirror 120 having two (2) mirror surfaces (indicated by a dotted line).

In FIG. 3, a joint portion defined between the cylindrical segments adjacent to each other is aligned with the rigid line 261 of the polygon mirror in the radial direction. Namely the rigid line of the polygon mirror is synchronized with the switching timing.

As described in the foregoing, the optical beam scanner of the invention is characterized as rotating a rotating polygon mirror at a high speed by the drive force of a rotating drive with brushes, and includes a rotating shaft to which the rotating polygon mirror for optical beam scanning is fixed, a magnet fixed to the inner circumferential surface of a yoke casing supporting the rotating shaft, and a rotor core fixed to the rotating shaft and confronting the magnet. Therefore, the balancing of the rotating shaft is ensured the parts cost is reduced, and performance impairment as well as noise leakage are prevented.

What is claimed is:

1. An optical beam scanner comprising:
   a polygon mirror; and
   a motor having a rotating shaft to which said polygon mirror is fixed, said motor including:
      a yoke casing having a magnet fixed on an inner circumferential surface thereof and supporting an upper portion of the rotating shaft through a first bearing;
      a rotor core secured to the rotating shaft and having a coil wound around salient poles;
      a brush holder supporting a lower portion of the rotating shaft through a second bearing;
      a commutator connected to the coil fixed to the rotating shaft; and
      a brush attached to said brush holder so as to be in pressure contact with said commutator.

2. An optical beam scanner as claimed in claim 1, wherein said commutator comprises a plurality of cylindrical segments which are insulated and contact the brush.

3. An optical beam scanner as claimed in claim 2, wherein a joint portion defined between adjacent ones of said cylindrical segments is aligned with a rigid line of said polygon mirror in a radial direction.

4. An optical beam scanner as claimed in claim 3, a magnetic center of said magnet and a magnetic center of said rotor core are shifted from each other.

\* \* \* \* \*